United States Patent Office 3,654,272
Patented Apr. 4, 1972

3,654,272
X-RAY CONTRAST MEDIA
Ernst Felder and Davide Pitre, Milan, Italy, assignors to Bracco Industria Chimica, Societa per Azioni, Milan, Italy
No Drawing. Continuation-in-part of application Ser. No. 814,164, Apr. 7, 1969. This application Aug. 13, 1969, Ser. No. 849,858
Claims priority, application Switzerland, May 2, 1968, 6,627/68
Int. Cl. C07c 103/32
U.S. Cl. 260—247.2 R          4 Claims

ABSTRACT OF THE DISCLOSURE

The di-(3-carboxy-2,4,6-triiodoanilides) of 4,7,10-trioxatridecane-1,13-dioic acid and 4,7,10,13-tetraoxahexadecane-1,16-dioic acid and the non-toxic water-soluble salts thereof with metals and amines are effective, well-tolerated X-ray contrast media which tend to accumulate in the gall bladder when their aqueous solutions are injected intravenously.

REFERENCE TO RELATED APPLICATION

This application is a continuation-in-part of our co-pending application Ser. No. 814,164, filed on Apr. 7, 1969, and now abandoned.

This invention relates to X-ray contrast media, and particularly to intravenously injectable media which tend to accumulate preferentially in the gall bladder and thus are useful in cholecystography.

Orally applied known contrast media for cholecystography require a waiting period of several hours before they provide gall bladder images of adequate density. The known contrast media capable of being applied intravenously are secreted to about equal parts into the urine and into the gall bladder, and the relatively high dosages required for producing adequate image density under these conditions may sometimes have lethal side effects (La Radiologia Medica, vol. 52, July 1966, pages 626–657).

The object of the invention is the provision of contrast agents for cholecystography which are preferentially secreted into the gall bladder and are well tolerated when intravenously injected at effective dosage rates.

It has been found that the di-(3-carboxy-2,4,6-triiodoanilides) of 4,7,10-trioxatridecane-1,13-dioic acid (Compound A) and 4,7,10,13-tetraoxahexadecane-1,16-dioic and (Compound B), which are acids of the formula

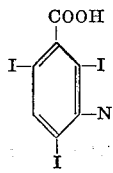 —NH—CO—CH$_2$CH$_2$—(O—CH$_2$—CH$_2$)$_n$—O—CH$_2$—CH$_2$—CO—NH— 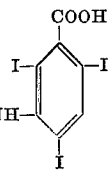

wherein n is 2 in Compound A, and n is 3 in Compound B, and their non-toxic, water soluble salts with metals and amines satisfy the afore-mentioned requirements to an extent not available heretofore with compounds of the same class.

Table I lists the toxicity to mice, the excretion rate in bile and urine, and the ratio of the excretion rates for Compounds A and B of this invention as well as for the chemically similar, known compounds iodipamide [adipic acid di-(3-carboxy-2,4,6-triiodoanilide); adipiodone; Compound C] and ioglycamic acid [diglycolic acid bis-(3-carboxy-2,4,6-triiodoanilide); Compound D].

Conventional standardized methods were used in obtaining the data listed in Table I, and all compounds were tested under carefully controlled identical conditions. The toxicities were determined by intravenous injection of aqueous solutions in mice within 30 seconds and calculated as DL$_{50}$ in mg./kg. The secretion values were determined in percent 3 hours after intraveous injection of 100 mg./kg. in rabbits.

TABLE I

| Compound | Toxicity DL$_{50}$, mg./kg. | Secretion, percent, in— Bile | Secretion, percent, in— Urine | Secretion ratio, bile/urine |
|---|---|---|---|---|
| A | 4,350 | 62 | 20 | 3.1 |
| B | 5,100 | 77 | 18 | 4.3 |
| C | 2,380 | 37 | 38 | 0.98 |
| D | 3,750 | 30 | 41 | 0.73 |

Comparison tests on dogs and cats were performed with Compounds A, B, and D to determine the cholecystographic index by Hoppe's method [see Margolin et al., Journal of the American Pharmaceutical Association, vol. 42 (1953), pages 476 to 481] whose values may vary between 0 and 4. The results are listed in Table II.

The superiority of the Compounds A and B of this invention over the known, chemically related Compounds C and D as to toxicity, preferential accumulation in the gall bladder, and image density is evident from the tables.

TABLE II

| Compound and note | Index after— 1 hr. | 2 hrs. | 4 hrs. | 5 hrs. | 6 hrs. | 8 hrs. | 24 hrs. |
|---|---|---|---|---|---|---|---|
| A–1/a | 2 | 2 | 2.5 | | 2.5 | 2 | 1.5 |
| A–2/a | 2 | 3 | 3.5 | | 4 | 4 | |
| A–1/b | 2.5 | 3 | 3 | | 3.5 | 3.5 | 2 |
| A–1/c | | | 3.25 | 3.5 | 4 | 3.75 | 2.5 |
| B–2/a | | 2 | 2 | | 1 | 0 | |
| B–1/b | 2 | 2.5 | 3 | | 3 | 3 | |
| B–2/b | 1.5 | 2.5 | 3.5 | | 4 | 4 | $^1$ 3 |
| B–1/c | | | 3 | 3.5 | 3.5 | 3.5 | |
| B–2/c | | | 3.5 | 4 | 4 | 4 | $^1$ 3 |
| D–1/a | 0.5 | 1 | 1 | | 1 | 1.2 | 0.5 |
| D–2/a | 0.5 | 0.7 | 1.2 | | 2 | 2.5 | |

$^1$ 3 after 32 hours; 2 after 48 hours.

NOTE.—1=dog; 2=cat; a=100 mg. compound per kg., i.v. injection; b=165.6 mg. organically bound I per kg. i.v. injection; c=165.6 mg. iodine/kg. i.v. infusion over 4 hours.

Because the free acids of the invention are not readily soluble in water, it is preferred to inject concentrated aqueous solutions of salts of the acids with non-toxic metals or amines. The sodium and lithium salts are most convenient among the metal salts. The wide variety of amines commonly used in galenic pharmacy and suitable for this invention includes particularly the alkanolamines, and we prefer presently to use the N-methylglucamine, diethanolamine, and morpholine salts individually or in mixtures with each other and with the alkali metal salts.

The injectable solutions of the invention are prepared by reacting 3-amino-2,4,6-triiodobenzoic acid with a reactive derivative of 4,7,10-trioxatridecane-1,13-dioic acid and 4,7,10,13-tetraoxahexadecane-1,16-dioic acid in an approximate mole ratio of 2:1, by converting the free acids so obtained to suitable salts, and by compounding the salts with pharmaceutically acceptable adjuvants to obtain solutions for parenteral injection.

The preferred reactive derivatives of 4,7,10-trioxatridecane-1,13-dioic acid and 4,7,10,13-tetraoxahexadecane-1,16-dioic acid include the acyl chlorides of the formula

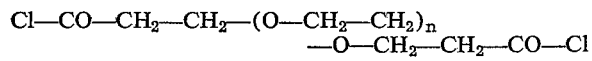

and mixed anhydrides of the acids such as those with acids of phosphorus, for example, 4,7,10-trioxatridecane-1,13-oyl-diphosphite, with hydrogen azide, with other carboxylic acids, or with semi-esters of carbonic acid. The reaction takes place readily when a mixture of the reactants is held for a sufficient time at a temperature between 20° C. and 250° C.

The folowing examples are further illustrative of this invention, and it will be understood that the invention is not limited thereto.

EXAMPLE 1

93.6 g. 3-amino-2,4,6-triiodobenzoic acid (0.18 mole) were suspended in 150 ml. dimethylacetamide, 30 g. 4,7,10 - trioxatridecane-1,13-oyl dichloride (0.10 mole) were added, and the mixture was agitated for three hours at 95° to 100° C. It was then stirred into 2000 ml. water, the precipitate formed was permitted to settle, the liquid was decanted, and the solid material was dissolved in a mixture of 50 ml. 18% sodium hydroxide and 950 ml. water. The solution was decolorized with sodium bisulfite, and was then added drop by drop to 2000 ml. water containing 30 ml. 36% hydrochloric acid.

The precipitate formed weighed 79 g., had a melting point of 105° to 117° C., and still contained a small amount of 3-amino-2,4,6-triiodobenzoic acid as an impurity. It was dissolved in 200 ml. water containing 20 ml. 30% ammonium hydroxide. When the solution was cooled to 5° C., ammonium 3-amino-2,4,6-triiodobenzoate was precipitated practically completely within two hours, and was removed by filtration. The filtrate was saturated with ammonium chloride, and the concentrated solution so obtained was stored for three days at 5° C. whereby the ammonium salt of 4,7,10-trioxatridecane-1,13-dioic acid di(3-carboxy-2,4,6-triiodoanilide) was precipitated. It was recovered by filtration, dissolved in 300 ml. water, and the solution was decolorized by means of active carbon and added drop by drop to 1000 ml. water containing 5 ml. 36% hydrochloric acid to precipitate the pure acid which was recovered.

It sintered at 133° C. and melted at 155° C. Its thin-layer chromatogram on silica gel, with chloroform-glacial acetic acid 19:1, gave an $R_f$ value of 0.66. It is practically insoluble in water, only sparingly soluble in chloroform, but readily dissolves in the lower alkanols. It was identified by its elementary analysis and by its equivalent weight.

Calculated: equ. weight, 622; C, 23.17%; I, 61.22%. Found: equ. weight, 620; C, 23.12%; I, 61.38%.

The salts with sodium and N-methylglucamine are soluble in water at 20° C. at a rate of about 100 grams per deciliter, and the lithium and other alkanolamine salts are similarly soluble in small amounts of water.

EXAMPLE 2

The 4,7,10-trioxatridecane-1,13-dioyl dichloride employed as a starting material in Example 1 was prepared as follows:

72.7 g. 4,7,10-trioxatridecane - 1,13 - dioic acid (I. N. Nazarov, Zhur. Obshchen. Khim. 24 (1954) 329–337) were cautiously mixed with 120 ml. thionyl chloride. The resulting exothermic reaction caused the release of gases, and formation of the desired acyl chloride in the nonvolatile residue. The reaction was brought to completion by heating at 40° to 50° C. for one hour, whereupon the reaction mixture was filtered and the filtrate was evaporated to remove the excess of thionyl chloride. It consisted of 83.2 g. 4,7,10-trioxatridecane-1,13-dioyl dichloride which was identified by its equivalent weight:

$AgNO_3$: Calculated (percent): 143.57. Found (percent): 144.8. NaOH: Calculated (percent): 71.79. Found (percent): 72.5.

EXAMPLE 3

10.3 g. 3-amino-2,4,6-triiodobenzoic acid (0.02 mole) were suspended in 20 ml. dimethylacetamide, 3.65 g. 4,7,10-tetraoxahexadecane - 1,16 - dioyl dichloride were added at 95° C., and the mixture was agitated at 95°–100° C. for three hours. It was then stirred into about 200 ml. water, the precipitate formed was allowed to settle, the supernatant liquid was decanted, and the residue was dissolved in 4 ml. 30% sodium hydroxide diluted with 200 ml. water. The solution was decolorized with active carbon and added dropwise to 100 ml. water containing 5 ml. 36% hydrochloric acid.

The crude Compound B precipitated thereby weighed 11.1 g. and had a melting point of 125°–130° C. It was dissolved in 18 ml. water containing 2 ml. 30% ammonium hydroxide, and 20 ml. saturated ammonium chloride solution were added to the solution. The ammonium salt of Compound B was precipitated during two days of storage at 5° C. It was filtered off, and dissolved in water. The purified free acid was precipitated by means of hydrochloric acid.

Compound B melts at 125° C. after sintering at 110° C. It was identified by its elementary analysis after drying in a vacuum at 120° C.

Calculated for $C_{26}H_{26}I_6N_2O_{10}$ (percent): C, 24.24; I, 59.12. Found (percent): C, 24.26; I, 59.07.

A thin layer chromatogram on silica gel with butanol/glacial acetic acid/water 3:2:1 gave an $R_f$ value of 0.53. The free acid is practically insoluble in water, ethyl acetate, and chloroform, but readily soluble in the lower alkanols. The sodium and N-methylglucamine salts are soluble in water at a rate of approximately 100 g./dl. at 20° C.

EXAMPLE 4

The 4,7,10,13-tetraoxahexadecane-1,16-dioyl dichloride employed in Example 3 was prepared by the following sequence of steps.

148.5 g. 3,6,9,12-tetraoxatetradecane - 1,14 - dicyanide, prepared by the method of U.S. Pat. No. 2,401,607 to Bruson, were added at 15° C. to a solution of 232 g. (2.45 moles) concentrated sulfuric acid in 290 ml. absolute ethanol. The mixture was refluxed and stirred for 15 hours, cooled to ambient temperature, and poured over 1000 g. ice and 250 g. ammonium sulfate. The diethyl ester of 4,7,10,13-tetraoxadecane - 1,16 - dioic acid was extracted with methylene chloride and recovered from the dried extract by evaporation of the solvent and distillation at 190°–195° C. and 0.005 mm. Hg in an amount of 97 g.

The recovered ester, dissolved in 200 ml. water, was added to a solution of 24.4 g. NaOH in 50 ml. water, and the saponification mixture was heated on a steam bath for 90 minutes. It was then extracted with diethyl ether. After evaporation of the aqueous phase and washing of the dry residue with acetone, the crude disodium salt of 4,7,10,13-tetraoxahexadecane-1,16-dioic acid was obtained in an amount of 107 g. having a melting point of 102°–104° C. and containing 87.8% of the pure compound (100% yield). It was dissolved in about 300 ml. water and decomposed by means of the stoichiometrically equivalent amount of hydrochloric acid.

The aqueous solution was evaporated to dryness and extracted with acetone for separation from sodium chloride. The acetone solution was evaporated, and the residue extracted with diethyl ether. When the dried ether extract was evaporated, 56 g. liquid 4,7,10,13-tetraoxahexadecane-1,16-dioic acid were obtained (68% yield). The acid was identified by its equivalent weight of 149.5 (calculated: 147.2).

100 ml. thionyl chloride were gradually added to the liquid acid with stirring, and the temperature of the mixture was held at 40° to 50° C. by heating after the exothermal reaction had subsided. When the reaction had been completed, the mixture was filtered, and the excess of thionyl chloride removed from the filtrate by evaporation in a vacuum.

4,7,10,13-tetraoxadecane-1,16-dioyl dichloride was obtained as a residue, and used in the method of Example 3.

EXAMPLE 5

An injectable solution of 4,7,10-trioxatridecane-1,13-dioic acid di-(3-carboxy-2,4,6-triiodanilide) was prepared according to the following prescription:

| | G. |
|---|---|
| 4,7,10-trioxatridecane-1,13-dioic acid di-(3-carboxy-2,4,6-triiodoanilide) | 491 |
| N-methylglucamine | 117.1 |
| Sodium hydroxide | 7.6 |
| Disodium edetate | 0.1 |
| Bi-distilled water to make 1,000 ml. | |

The solution obtained was adjusted to pH 7.1±0.2, subjected to ultrafiltration, transferred to vials containing 10 and 20 ml. each, and sterilized in the vials. It contained 300 mg. iodine per ml. A corresponding solution of 508 g. Compound B was obtained in the same manner.

EXAMPLE 6

Another solution was prepared according to the following prescription for intravenous infusion:

| | G. |
|---|---|
| 4,7,10 - trioxatridecane - 1,13 - dioic acid di(3-carboxy-2,4,6-triiodoanilide) | 245.8 |
| N-methylglucamine | 39 |
| Sodium hydroxide | 7.78 |
| Disodium edetate | 0.1 |
| Bi-distilled water to make 1,000 ml. | |

The solution so obtained was adjusted to pH 7.1±0.1, filtered as in Example 1, transferred to 100 ml. bottles, and sterilized in the same. It contained 150 mg. iodine per ml. An equivalent solution was prepared from 254 g. Compound B.

Other injectable solutions containing 140 to 380 mg. iodine per milliliter can readily be prepared in a manner obvious from Examples 5 and 6. The mixtures of methylglucamine and sodium salts resulting from the methods more specifically described in these examples may be replaced by other salts enumerated above without basic changes.

The solutions of the invention are preferably applied by intravenous injection or by infusion. The normal dosage of Compounds A and B for cholecystography in adult humans is 4 to 12 grams, good results being obtained in most adults with approximately 8 grams. Solutions containing approximately 50% to 60% of Compounds A and B have been injected intravenously without undesirable side-effects.

What is claimed is:

1. A compound which is an acid of the formula

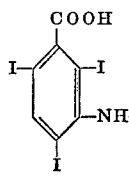 —NH—CO—CH$_2$—CH$_2$—(O—CH$_2$—CH$_2$)$_n$—O—CH$_2$—CH$_2$—CO—NH— 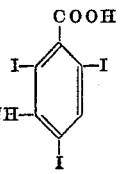

wherein $n$ is 2 or 3, or a non-toxic water soluble salt of said acid.

2. A compound as set forth in claim 1, wherein $n$ is 3.

3. A compound as set forth in claim 2, which is a salt of said acid with sodium, lithium, N-methylglucamine, diethanolamine, or morpholine.

4. A compound as set forth in claim 1, which is a salt of said acid with sodium, lithium, N-methylglycamine, diethanolamine, or morpholine.

References Cited

UNITED STATES PATENTS 3,389,170   6/1968   Habicht et al. _____ 260—501.11

LORRAINE A. WEINBERGER, Primary Examiner

L. A. THAXTON, Assistant Examiner

U.S. Cl. X.R.

260—501.11, 519; 424—5